United States Patent [19]

Jacques

[11] 4,076,651

[45] Feb. 28, 1978

[54] AGGLOMERATED SILICEOUS BODIES

[75] Inventor: Roland Jacques, Ales, France

[73] Assignee: Rhone-Poulenc Industries, Paris, France

[21] Appl. No.: 742,243

[22] Filed: Nov. 16, 1976

[30] Foreign Application Priority Data

Nov. 20, 1975 France ................................ 75 35453

[51] Int. Cl.² ........................ B01J 21/08; B01J 29/00; C01B 33/12
[52] U.S. Cl. ..................................... 252/451; 423/338
[58] Field of Search ................. 252/451; 423/335, 338

[56] References Cited

U.S. PATENT DOCUMENTS

| 3,161,468 | 12/1964 | Walsh | 423/335 |
| 3,387,931 | 6/1968 | Burke, Jr. | 423/335 |

Primary Examiner—Carl F. Dees
Attorney, Agent, or Firm—Bacon & Thomas

[57] ABSTRACT

Agglomerated siliceous bodies exhibiting superior mechanical properties are disclosed, as well as the process therefor. Shaped articles of superior mechanical strength are produced by carefully controlled partial desiccation of silica hydrogel particles followed by compression thereof to a shape-sustaining mass.

15 Claims, No Drawings

AGGLOMERATED SILICEOUS BODIES

BACKGROUND OF THE INVENTION

1. Field of the Invention

The present invention relates broadly to shaped, consolidated siliceous bodies and, more especially, the process for their production. Additionally, the present invention relates to the utility of such shaped articles in the areas of catalyst carriers, absorbents, and in chromatography.

2. Description of the Prior Art

The broad utility, and importance, of siliceous bodies and, particularly those having specific surfaces (measured in terms of $m^2/g$), are well known in such fields as adsorption and catalysis. Moreover, numerous conventional methods are employed in the manufacture of these articles, particularly involving the shaping of oxides or hydroxides. For example, it is generally known to agglomerate, by compression or extrusion, powders or finely divided grains of these oxides or hydroxides to yield a desired shape. Similarly, other conventional methods rely upon the gelling of drops of sols of the appropriate oxides or hydroxides in liquids which are substantially immiscible with water. As used in this specification, and in the claims, the term "substantially immiscible with water" is meant to include those liquids which are either immiscible, or only slightly miscible, with water.

Articles obtained by the gelling of silica sol drops are observed to have adequate surface properties and are suitable for use in conjunction with processes conducted in fluidized beds where these particles exhibit a remarkable wear resistance. Typically, in these environments, the dimensions of the bodies do not exceed something on the order of 1 mm.

Larger, hard and wear-resistant, bodies may similarly be obtained by the gelling process; however, these larger bodies suffer a significant disadvantage resulting from the creation of internal stresses, postulated to arise from excessively rapid changes in the water content of the medium into which the bodies are dropped. Accordingly, inferior catalysts are obtained when these larger bodies are, for example, impregnated with various conventional compounds for this purpose. Similarly, mechanical integrity or solidity is observed to be substandard, rendering these larger bodies unsuited for numerous applications.

Bodies obtained by agglomerating, by compressing, or by extruding fresh silica gels, although likely to have surface properties suitable for many uses, often exhibit reduced and substandard mechanical strength precluding their use for many purposes. Depending upon the nature of these bodies, the inherent degradation results in fracture or excessive wear through frictional contact. Various methods have been proposed, and employed, with an eye toward improving the mechanical properties of these bodies, particularly by the addition of bonding agents in the form of clays, sodium silicate, or silica sol. However, although some progress has been achieved in improving mechanical properties, the mechanical strength of these bodies remains substandard for numerous applications.

Accordingly, the need exists to produce agglomerated or consolidated siliceous bodies of large dimensions which do not suffer the significant disadvantage of poor mechanical strength but, on the contrary, exhibit improved mechanical properties. Additionally, the need exists to produce such bodies without the requirement of adding various additional bonding agents and which are adapted for further impregnation without suffering mechanical degradation or deterioration.

SUMMARY OF THE INVENTION

In accordance with the deficiencies of the prior art, it is the major object of the present invention to produce consolidated siliceous bodies of large dimensions and high mechanical strength without the need for additions of bonding agents therefor.

It is also an object of the present invention to provide large-dimensioned, strong, wear-resistant siliceous bodies which may be impregnated without mechanical degradation or physical deterioration.

Still a further object of the present invention is to produce large-dimensioned, strong, and wear-resistant siliceous bodies by the agglomeration of particles of specifically treated silica hydrogels.

Yet another object of the present invention is to produce large-dimensioned, strong, and wear-resistant consolidated siliceous bodies adapted for use as absorbents, catalyst carriers, and for use in chromatography.

Yet further objects of the present invention will become apparent to the skilled artisan upon examination of the detailed description of the invention and exemplary embodiments disclosed therein.

It has been determined in accordance with the present invention that consolidated siliceous bodies of improved mechanical strength and wear-resistance may be obtained by carefully controlled partial desiccation of silica hydrogel particles to yield a modified particle having specific water content. These modified particles are thence compressed to the desired shape and degree of porosity. It has been determined, in conjunction with these requirements, that the water content of the modified particles, and pH of the treatment medium employed in producing the silica hydrogel particles, are critical, the former more so than the latter. Accordingly, it is essential that the silica hydrogel particles be prepared, or otherwise treated prior to partial desiccation, to provide a pH greater than or equal to 6. Also, it is critically essential that the water content of the modified particles following partial desiccation be within the range of from about 25 to about 50% by weight. Bound with this latter requirement of water content, it has been ascertained that the most satisfactory method for partial desiccation is rapid heat treatment for a period less than approximately 5 seconds at a temperature between about 300° and about 1,000° C.

The thus-treated, partially-desiccated silica hydrogel particles are compressed to the desired shape. Following the compression, the body may be calcined, or otherwise conventionally treated for use as a catalyst, absorbent, or for use in chromatography.

DETAILED DESCRIPTION OF THE INVENTION

The present invention is directed toward overcoming the inability of the prior art to provide consolidated siliceous bodies having large dimensions but which do not suffer the significant disadvantages of very poor mechanical strength and integrity. The term large dimension is meant to connote articles or bodies having dimensions greater than 1 mm., and which may exceed 10 mm.. The distinction is significant insofar as agglomerated siliceous bodies having dimensions on the order of 1 mm. have been found suitable with respect to mechanical strength, while the increase in the dimension of the article has been found to result in a substantial decrease in that property.

In its most condensed form, the essence of the present invention lies with the surprising discovery that very specific pre-treatment of the particles to be shaped can not only eliminate the problems of inferior mechanical strength but actually enhance the physical properties of the shaped body by increasing resistance to wear and deterioration.

In order to more fully elucidate upon the various objects and advantages of the present invention, the following detailed description will be given in terms of various preferred embodiments and exemplified with respect thereto, the same intended to be illustrative and in no wise limitative.

The process of the present invention for manufacture of consolidated siliceous bodies utilizes particles of silica hydrogel which are preferably micro-spheres obtained by gelling. Partial desiccation is achieved by controlled heating for a period less than about 5 seconds at a temperature between about 300° and about 1,000° C to yield a modified particle having a water content within the range of from about 25% to about 50%. The preferred heating is achieved by exposing the hydrogel particles to a flowing gas stream and, accordingly, the temperature range given above refers to the input temperature of the hot gases. Following the heat treatment, the modified particles may then be compressed.

Depending upon the conditions obtaining in the preparation of the silica hydrogels, it is possible to derive a wide range of siliceous bodies having widely differing properties. Apart from the heat-treatment conditions to obtain the modified particles of desired water content, a greater number of other process parameters have been found to significantly influence the properties of the consolidated article. Those having the most substantial affects may be cataloged as the nature of the composition from which the silica hydrogels are obtained; the manner in which the gelling operation is conducted; the dimensions, distribution, and shapes of the hydrogel particles to be consolidated; the pH value of the medium from which the silica hydrogels are obtained or in which they are washed; the type of press employed in the consolidating or agglomerating step; the conditions under which the compression is conducted, and particularly the pressures developed; the type of pressing aid employed such as, for example, stearates or graphite; the dimensions of the siliceous body obtained after pressing, as well as its physical form such as, for example, cylindrical, tubular, spherical, or annular; and, subsequent treatments of the article or body obtained.

The preferred particles for use in preparing the consolidated articles of the present invention are micro-spheres obtained by gelling droplets of silica sol resulting from acidification of sodium silicate by conventionally employed acids for this purpose. The gelling is conducted in a liquid substantially immiscible with water.

It has been determined that the solidity or integrity of the agglomerated bodies obtained increases with pH, this parameter having a known effect upon the specific surfaces of these agglomerates. Thus, silica hydrogel particles particularly suited for the purpose of the present invention are those obtained, or treated before heating, in a medium having a pH value greater than or equal to 6.

The micro-spheres resulting from the aforenoted gelling process exhibit diameters, measured on the dried particles, between about 10 and about 300 microns. However, because the dimensions and distribution of the particles employed are not critical factors, it is equally feasible to employ hydrogel particles obtained by crushing and screening a hydrogel mass.

While the dimensions and distribution of the particles are not critical, it has been determined that water content of the individual particles is a highly critical factor in successfully practicing the present invention. Typically, the silica hydrogel particles employed in conjunction with the process of the present invention contain water in a quantity of approximately 80%. It having been determined that a water content within the range of from about 25 to about 50% is critical, it is thus manifestly necessary to reduce the water content to a level within this range. Moreover, it has surprisingly been determined that the treatment for reduction of water content, i.e., partial desiccation, should be conducted as rapidly as possible and, generally, for less than a few seconds. Optimally, the heat treatment will be one wherein the particles are exposed to a flowing, hot gas stream for about 2 seconds, the stream having a temperature advantageously in the region of 400° C. It will obviously be appreciated by the skilled artisan that the dwell period and the input temperature of the hot medium are interdependent factors in accomplishing partial desiccation. Consequently, a dwell period of less than about 3 seconds for an input temperature within the range of from about 300° to about 1,000° C is preferred for the process of the present invention. Dwell periods of up to about 5 seconds for this temperature range are suitable.

As noted above, the heat treatment of the hydrogel particles is achieved by introducing the particles into a stream of hot gases, these gases being obtained by the combustion of a suitable gas or liquid. Such a method of heating is well known and has, in fact, been used to produce active alumina in powder form from alumina hydrate. Such an active alumina has been desirable since it has the ability, when re-hydrated, to set in a manner similar to that of hydraulic bonding agents. However, this method does not modify silica hydrogels in a like manner due to the different chemical natures between silica hydrogels and alumina hydrates, as the former contain large quantities of water and are subsequently agglomerated without the addition of water. Moreover, the silica hydrogels could not be agglomerated if their degree of desiccation were on the same order as that of active alumina.

In order to obtain the optimum mechanical strength in the siliceous particles produced by the present invention, it is advantageous to agglomerate the silica hydrogel particles immediately after they have been subjected to the thermal treatment. However, it has been observed that agglomeration may be delayed for a period of up to about 2 days without significant diminution in the mechanical properties obtained. Also, it should be noted that although it may be preferred to dry the hydrogel particles before heating, it is also within the scope of the present invention to pulverize a slurry of these particles within the hot medium to eliminate the need for the drying operation, the heating conditions for partial desiccation then being appropriately adjusted to accomplish the evaporation of the additional quantities of water present.

Various additional components may be admixed, in slight proportions, with the silica hydrogel particles prior to the agglomeration or consolidation step. Thus, constituents having catalytic properties, such as divided oxides or chemical compounds, may be added recognizing, however, that these constituents play no part in the agglomeration procedure. Similarly, it is possible to add powders or particles of other constituents to the silica hydrogel particles to impart additional properties to the complex bodies obtained. Accordingly, in addition to those powders or particulates having catalytic properties, there may be added materials which possess absorbent properties, such as synthetic zeolites. Thus, it is possible to obtain complex catalyst carriers wherein an amorphous siliceous substance contains crystallizable elements and the like. The skilled artisan will appreciate that the amounts of such additional components must be restricted in order to avoid compromising the solidity or integrity of the siliceous bodies obtained. Also, it is feasible to add constituents which may be eliminated after the consolidation step in order to control porosity within a desired range; such agents as sulfur, graphite, wood charcoal, and the like being particularly useful for this purpose.

It is sometimes preferable to subject the silica hydrogel particles intended for ultimate consolidation to various washing operations interposed between heating operations, in order to reduce to acceptable levels various compounds normally present in the silica hydrogels as the result of the nature of the compounds from which they are obtained. For example, such compounds as alkaline silicates, which are typically gelled by the addition of acids, provide alkaline salts corresponding to these acids which, in fact, may be detrimental to the ultimate application of the agglomerated siliceous body. The intermediate washing operations, however, have been found to adequately reduce the content of these undesirable compounds to a tolerable level.

It is also possible to subject the consolidated siliceous articles of the present invention to various conventional treatments following the consolidation. These well-known treatments include drying, calcining, washing, and the like in order to confer upon the bodies surface properties necessary for a given application.

The agglomeration of the siliceous bodies obtained by the method according to the present invention is conducted by compression. The pressure employed may vary widely depending upon the shape of the body and degree of porosity desired, and physical characteristics needed, but when it is required to obtain agglomerated bodies having high crushing resistance, consolidation pressures are preferably higher than 70 bars.

Siliceous bodies obtained in accordance with the present invention have utility in many fields, particularly that of catalysis wherein they may act as carriers for various catalysts, in chromatography, and, generally, in applications requiring the use of bodies having high absorbent characteristics.

To further illustrate the method of the present invention, and contrast the same with known methods and articles, the following examples will be given as illustrative, and not limitative.

EXAMPLE I

A composition based upon silica hydrogel particles was prepared in the form of micro-spheres by gelling a silica sol having a pH value of 9, the sol having been obtained from sodium silicate and nitric acid. Measured in the dry state, the diameters of these micro-spheres ranged from 40 to 300 microns and exhibited a specific surface from 250 to 300 $m^2/g$. These micro-spheres, which were not dried, were allowed to evaporate their moisture and were then placed in a tube through which was conducted a stream of hot gas obtained by mixing, with a current of air, gases obtained by the combustion of propane. The input temperature of this gas stream was 400° C and the dwell period was 2 seconds. The temperature of the gases emitted from the tube had been reduced to only 200° C. The micro-spheres were collected and exhibited a residual water content of 32% measured by drying at 250° C.

A number of test specimens were obtained by agglomerating 7 g. charges of these micro-spheres under compression in a 27.2 mm. diameter die of a hydraulic press. Pressures ranging from 40 to 100 bars were applied to yield tablets of various thicknesses. The tablets were dried and calcined at 600° C. The results of this test are set forth in Table I.

TABLE I

| | | Tablets calcinated at 600° C | | | | |
|---|---|---|---|---|---|---|
| Pressure bars | Initial Tablet Thickness mm | Thickness mm | Diameter mm | Mean crushing resistance kg | Total porosity $cm^3/100\ g$ | Specific surface $m^2/g$ |
| 40 | 20.5 | 19.4 | 24.1 | 8 | 118 | 200 |
| 50 | 19.7 | 18.7 | " | 10.8 | 113 | " |
| 60 | 18.5 | 17.5 | " | 17 | 110 | " |
| 70 | 17.5 | 16.5 | " | 24 | 100 | " |
| 80 | 17 | 16.4 | " | 25 | 100 | " |
| 90 | 16.8 | 16 | " | 35 | 94.4 | " |
| 100 | 15.7 | 15 | " | 45 | 85 | " |

It is to be noted that the specific surface of the shaped bodies is not significantly influenced by the pressure employed, and that total porosity varies only slightly with pressure. However, as illustrated in Table I, the mean resistance to crushing increases directly with pressure and the data indicate that the agglomerated bodies obtained possess sufficient resistance to enable them to be used industrially.

EXAMPLE II

In order to examine the influence of various parameters of the present process on the properties of agglomerated bodies obtained after drying, washing, and calcining at 600° C, various tests were performed. These tests were each conducted on agglomerated bodies obtained by compressing silica hydrogel particles in a mechanical compressing machine equipped with three 9 mm. diameter punches. A pressure of 70 bars was used. The particles subjected to agglomeration were obtained either by crushing silica gel in the form of a mass obtained by reacting sodium silicate and nitric acid, or were micro-spheres, having different pH values and particle size distributions. The thermal treatment of the particles, regardless of their origin, was conducted by means of the same apparatus described in Example I. The residual water content of the particles after thermal treatment, measured by drying at 250° C, was varied for each particular test by adjustment of the input temperature of the hot gases as well as by controlling the admission of the particles. Agglomeration was carried out by adding to the particles 1% of calcium stearate as an agglomeration aid. The agglomerated bodies obtained were then dried at 100° C, washed in a stream of water, and calcined at 600° C.

Table II illustrates the test conditions for the various samples and the results observed:

TABLE II

| Test No. | Properties of original particles | | | Period of dwell seconds | Input T °C | Residual water content of heated particles % by weight | Properties of agglomerated bodies obtained after drying, washing, and calcining at 600° C | | |
|---|---|---|---|---|---|---|---|---|---|
| | pH | Shape | Particle Size | | | | Resistance to crushing kg | Specific surface $m^2g$ | Total volume of pores $cm^3/100g$ |
| 1 | 8 | micro-spheres | 20/150μ mean dia. 80μ | 2 | 400 | 37 | 10 | 300 | 55 |
| 2 | 8 | " | 40/300μ mean dia. 150μ | 2 | 400 | 42 | 8 | 300 | 55 |
| 3 | 8 | crushed and screened gel | 50/150μ mean dia. 100μ | 2 | 400 | 42 | 8 | 320 | 50 |
| 4 | 8 | " | 40/300μ mean dia. 180μ | 2 | 400 | 45 | 6 | 350 | 55 |
| 5 | 8 | micro-spheres | 20/150μ mean dia. 80μ | 2 | 700 | 20 | agglomeration difficult | | |
| 6 | 8 | " | " | 2 | 400 | 30 | 9 | 300 | 55 |
| 7 | 8 | " | " | 2 | 350 | 57 | not agglomerable - exudation of water | | |
| 8 | 8 | " | " | 2 | 400 | 31 | 11 | 290 | 55 |
| 9 | 8 | " | " | 2 | 400 | 42 | 10 | 300 | 55 |
| 10 | 7 | " | " | 2 | 400 | 40 | 6 | 500 | 55 |
| 11 | 5 | " | " | 2 | 400 | 37 | agglomeration difficult | | |

It is apparent from these tests that the pH value and the percentage by weight of residual water of the heated particles (which is directly related to the heat treatment time and temperature of the gas stream) are significant parameters, the values of which are critical in obtaining agglomerated bodies having acceptable physical properties. Compare, for example, Tests 5, 7, and 11, which reflect the importance of pH and residual water content.

EXAMPLE III

In order to provide further basis for comparison between the process of the present invention and other conventional techniques, the effect of the length of time of heat treatment was examined. Silica gel microspheres, similar to those employed in Test 1 of Example II, were heated in a stove at 150° C so that the residual water content was reduced to 37%. This heat treatment requires several minutes to achieve a water content within the range of the present invention, a deviation from the desired rapid heat treatment of the present process. These spheres were then agglomerated under the same conditions as those described in connection with Example II, 1% by weight of calcium stearate also being added. The agglomerated siliceous bodies obtained after drying, washing, and calcining at 600° C were very friable.

While the invention has now been described in terms of certain preferred embodiments, and exemplified with respect thereto, the skilled artisan will recognize that various changes, modifications, substitutions, and omissions may be made without departing from the spirit thereof. Accordingly, it is intended that the scope of the present invention be limited solely by that of the following claims.

What is claimed is:

1. A method for preparing agglomerated siliceous bodies of large dimensions, exhibiting improved physical strength and wear-resistance, from silica hydrogel particles, comprising the steps of:
   a. partially desiccating silica hydrogel particles by heating for a period of less than about 5 seconds in a medium having a temperature in the range of from about 300° to about 1,000° C to yield modified particles having a water content within the range of from about 25 to about 50%; and,
   b. compressing said modified particles to form a shape-sustaining, agglomerated siliceous body.

2. The method of claim 1, wherein said silica hydrogel particles employed in the partial desiccating step have a pH greater than or equal to about 6.

3. The method of claim 2, further comprising the step of preparing said silica hydrogel particles prior to said partial desiccating step by gelling droplets of silica sol in a liquid which is substantially immiscible with water.

4. The method of claim 2, further comprising the step of preparing said silica hydrogel particles prior to said partial desiccating step by crushing a mass of silica hydrogel.

5. The method of claim 2, further comprising the step of admixing a particulate, selected from the group consisting of catalytically-effective and absorbent-effective compounds, with said modified particles prior to said compressing step.

6. The method of claim 2, further comprising the steps of:
   a. admixing a pore-forming particulate, of a chemical composition capable of removal from said self-sustaining, agglomerated siliceous body, prior to said compressing step; and,
   b. removing said pore-forming particulate subsequent to said compressing step to yield a porous, self-sustaining, agglomerated siliceous body.

7. The method of claim 6, further comprising the step of impregnating said porous, self-sustaining, agglomerated siliceous body with a composition selected from the group consisting of catalytically-effective and absorbent-effective compositions.

8. The method of claim 2, wherein said partial desiccating step comprises exposing said silica hydrogel particles to a gaseous stream having a temperature within the range of from about 300° to about 1,000° C.

9. The method of claim 2, further comprising the step of calcining said agglomerated siliceous body after said compressing step.

10. An agglomerated siliceous body of large dimensions, exhibiting improved physical strength and wear-resistance, comprising compressed, partially desiccated silica hydrogel particles having a water content in the range of from about 25 to about 50%.

11. The agglomerated siliceous body of claim 10, further comprising a composition selected from the group consisting of catalytically-effective and absorbent-effective compositions.

12. The product produced in accordance with the method of claim 9.

13. The product produced in accordance with the method of claim 5.

14. The product produced in accordance with the method of claim 7.

15. A catalyst carrier comprising the product of claim 10.

* * * * *